United States Patent
Zou et al.

(10) Patent No.: US 11,252,270 B2
(45) Date of Patent: Feb. 15, 2022

(54) DISPLAY SCREENS AND METHODS FOR MANUFACTURING DISPLAY SCREENS

(71) Applicant: Kunshan Go-Visionox Opto-Electronics Co., Ltd., Kunshan (CN)

(72) Inventors: Min Zou, Kunshan (CN); Xiaoxu Hu, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 374 days.

(21) Appl. No.: 16/511,002

(22) Filed: Jul. 15, 2019

(65) Prior Publication Data

US 2019/0342434 A1    Nov. 7, 2019

Related U.S. Application Data

(63) Continuation of application No. PCT/CN2018/106318, filed on Sep. 18, 2018.

(30) Foreign Application Priority Data

Apr. 24, 2018 (CN) .......................... 201810373241.9

(51) Int. Cl.
    *H04M 1/02*          (2006.01)
    *G02F 1/1333*      (2006.01)

(52) U.S. Cl.
    CPC ..... *H04M 1/0266* (2013.01); *G02F 1/133328* (2021.01); *G02F 2201/56* (2013.01)

(58) Field of Classification Search
    CPC ............ H04M 1/0266; G02F 1/133328; G02F 2201/56
    See application file for complete search history.

(56) References Cited

U.S. PATENT DOCUMENTS

2006/0192815 A1    8/2006   Donaldson et al.
2014/0202985 A1    7/2014   Fujii
(Continued)

FOREIGN PATENT DOCUMENTS

CN       105357884 A     2/2016
CN       105541095 A     5/2016
(Continued)

OTHER PUBLICATIONS

CN First Office Action dated Sep. 11, 2019 in the corresponding CN application (application No. 201810373241.9).
(Continued)

*Primary Examiner* — Lucy P Chien
(74) *Attorney, Agent, or Firm* — Kilpatrick Townsend & Stockton

(57) ABSTRACT

The present disclosure relates to a method of manufacturing a display screen and a special-shaped display screen. The method of manufacturing the display screen includes the following steps: processing the display screen by a material-reduction process to form the display screen with a first mounting groove; and processing the first mounting groove by a material-reduction process to form a second mounting groove. The display screen includes opposite disposed upper and lower surfaces, the first mounting groove and the second mounting groove extend through the upper surface and the lower surface, and a curvature radius of an orthographic projection of the second arcuate transition surface on a plane.

19 Claims, 5 Drawing Sheets

(56) References Cited

U.S. PATENT DOCUMENTS

| | | |
|---|---|---|
| 2014/0376161 A1 | 12/2014 | Sung |
| 2015/0144676 A1 | 5/2015 | Johnson et al. |
| 2016/0233157 A1 | 8/2016 | Lim et al. |
| 2017/0217818 A1 | 8/2017 | Dumenil et al. |
| 2017/0358612 A1 | 12/2017 | Evans, V et al. |
| 2018/0240377 A1 | 8/2018 | Xu et al. |
| 2021/0011566 A1* | 1/2021 | Bai .................. G06F 1/1637 |

FOREIGN PATENT DOCUMENTS

| | | | |
|---|---|---|---|
| CN | 105788462 | A | 7/2016 |
| CN | 106057091 | A | 10/2016 |
| CN | 205684738 | U | 11/2016 |
| CN | 107160265 | A | 9/2017 |
| CN | 107511594 | A | 12/2017 |
| CN | 107765919 | A | 3/2018 |
| CN | 107784939 | A | 3/2018 |
| EP | 2891634 | A1 | 7/2015 |
| EP | 3112324 | A1 | 1/2017 |
| JP | S5672416 | A | 6/1981 |
| JP | 2004256380 | A | 9/2004 |
| JP | 2005097107 | A | 4/2005 |
| JP | 2006035362 | A | 2/2006 |
| JP | 2012197224 | A | 10/2012 |
| JP | 2013152525 | A | 8/2013 |
| JP | 2015178453 | A | 10/2015 |
| JP | 2017109911 | A | 6/2017 |
| JP | 2017526603 | A | 9/2017 |
| KR | 101686235 | B1 | 12/2016 |
| KR | 20180012238 | A | 2/2018 |
| TW | 200406309 | A | 5/2004 |
| TW | 201413554 | A | 4/2014 |

OTHER PUBLICATIONS

TW First Office Action dated Jul. 30, 2019 in the corresponding TW application (application No. 107138282).
Office Action of JP Patent Application No. 2020-501466.
Office Action of KR Patent Application No. 10-2020-7006557.
European Search Report of EP Patent Application No. 18916699.4.

* cited by examiner

DISPLAY SCREENS AND METHODS FOR MANUFACTURING DISPLAY SCREENS

CROSS REFERENCE TO RELATED APPLICATIONS

This application is a continuation application of International Application No. PCT/CN2018/106318, filed on Sep. 18, 2018, which claims the priority benefit of Chinese Patent Application No. 201810373241.9, titled "GROOVING METHODS OF DISPLAY SCREENS AND DISPLAY SCREENS" and filed on Apr. 24, 2018. The entireties of both applications are incorporated by reference herein for all purposes.

TECHNICAL FIELD

The present disclosure relates to display technologies.

BACKGROUND

With the increasing requirements for smart devices such as smart phones, a full screen with ultra-high screen ratio has become a trend in the field of smart phones. Since a frame of the full screen is extremely narrow, it is necessary to define an accommodating groove on a display screen to provide enough space to accommodate electronic elements.

SUMMARY

Accordingly, the present disclosure provides a grooving method of a display screen and a display screen for solving the above problem.

A grooving method of a display screen is provided in the present disclosure, which includes:

processing a display screen by a material-reduction process to form a first mounting groove on the display screen, where two adjacent side surfaces of the first mounting groove are connected via a first arcuate transition surface;

processing the first mounting groove by a material-reduction process to form a second mounting groove, where two adjacent side surfaces of the second mounting groove are connected via a second arcuate transition surface.

In an embodiment, the display screen includes opposite disposed upper surface and lower surface. The first mounting groove and the second mounting groove extend through the upper surface and the lower surface. And a curvature radius of an orthographic projection of the second arcuate transition surface on a plane in which the upper surface is located is smaller than a curvature radius of an orthographic projection of the first arcuate transition surface on the plane in which the upper surface is located.

In the above grooving method of the display screen, processing difficulty of the arcuate transition surface gradually decreases as the curvature radius of the orthogonal projection of the arcuate transition surface on the plane in which the upper surface is located decreases, thus the first arcuate transition surface with a larger curvature radius is firstly formed via material-reduction processing. And then the second arcuate transition surface with a smaller curvature radius is formed via further material-reduction processing, which is different from a manner in which the arcuate transition surface with a smaller curvature radius is directly formed via one-time material-reduction processing, thereby reducing requirements of processing equipment and processing difficulty, and enhancing cutting accuracy and yield rate of the display screen.

In an embodiment, the first arcuate transition surface and the second arcuate transition surface are both circular-arcuate transition surfaces.

In an embodiment, a ratio of the curvature radius of the orthographic projection of the first arcuate transition surface on the plane in which the upper surface is located to the curvature radius of the orthographic projection of the second arcuate transition surface on the plane in which the upper surface is located is greater than 1.1.

In an embodiment, the processing the first mounting groove by a material-reduction process to form a second mounting groove, where two adjacent side surfaces of the second mounting groove are connected via a second arcuate transition surface includes processing the first arcuate transition surface and the side surfaces connected to the first arcuate transition surface by a material-reduction process.

In an embodiment, the processing the first mounting groove by a material-reduction process to form a second mounting groove, where two adjacent side surfaces of the second mounting groove are connected via a second arcuate transition surface includes processing the first arcuate transition surface by a material-reduction process.

In an embodiment, the first mounting groove is formed by splitting the display screen.

In an embodiment, the second mounting groove is formed by grinding the first mounting groove.

In an embodiment, the second mounting groove has an axisymmetric shape.

In an embodiment, the first mounting groove is formed in a middle portion of an end of the display screen.

In an embodiment, a portion of a groove wall of an initial groove coincides with a portion of a groove wall of a finished groove.

In an embodiment, the initial groove and the finished groove are both opened grooves.

In an embodiment, the groove wall of the initial groove further incudes a third arcuate groove wall section disposed at an opening of the initial groove, the third arcuate groove wall section and groove walls adjacent the third arcuate groove wall section are smooth-transitionally connected. And the groove walls of the finished groove further comprises a fourth arcuate groove wall section disposed at an opening of the finished groove. And the fourth arcuate groove wall section and groove walls adjacent to the fourth arcuate groove wall section are smooth-transitionally connected.

In an embodiment, the finished groove is substantially rectangular or trapezoidal.

In an embodiment, the initial groove and the finished groove are both closed grooves.

In an embodiment, a material-reduction processing manner of the first material-reduction processing operation is different from a material-reduction processing manner of the second material-reduction processing operation.

In an embodiment, the first material-reduction processing operation employs a cutting process to form the initial groove.

In an embodiment, the cutting process is a splitting processing manner.

In an embodiment, the second material-reduction processing operation employs a grinding processing manner to form the finished groove; or the second material-reduction processing operation employs a combination of a cutting processing manner and a grinding processing manner to form the finished groove.

In an embodiment, the first material-reduction processing operation and the second material-reduction processing operation both employ cutting processes.

A display screen is provided in the present disclosure, which is provided with a groove produced by the aforementioned the grooving method of the display screen.

DETAILED DESCRIPTION OF THE EMBODIMENTS

Figure 1:
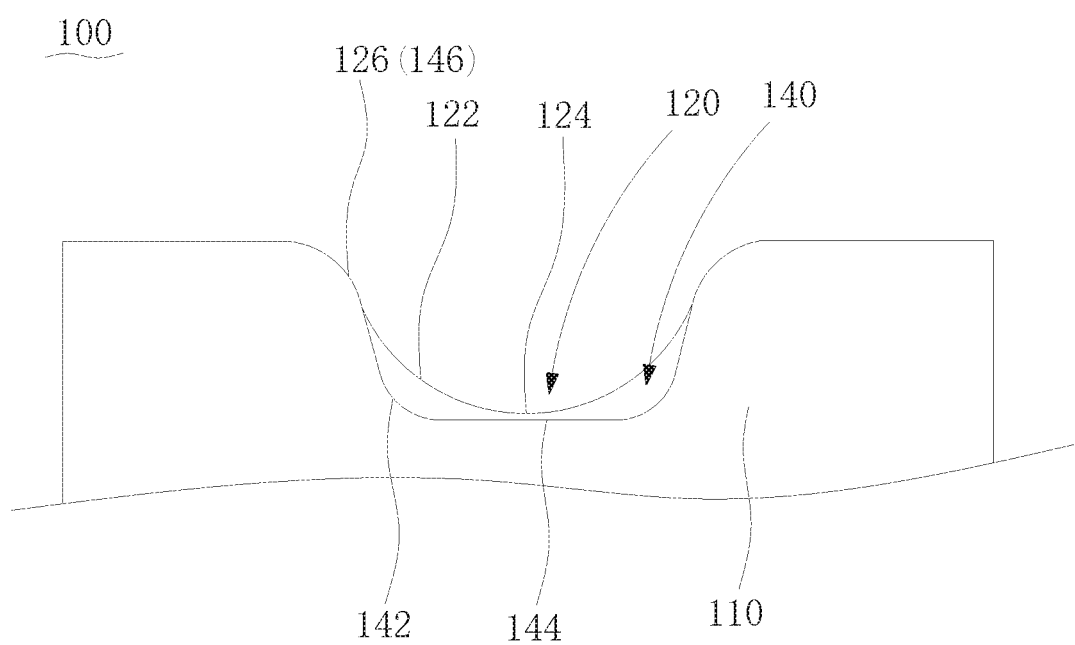
FIG. 1 illustrates a processing schematic diagram of a display screen in accordance with an embodiment.

In order to facilitate the understanding of the present disclosure, it will be described more fully hereinafter with reference to the accompanying drawings. Preferred embodiments of the present disclosure are shown in the drawings. However, the disclosure can be embodied in many different forms and is not limited to the embodiments described herein. Rather, these embodiments are provided so that the understanding of the disclosure of the present application will be more thorough and comprehensive.

It should be noted that when an element is referred to as being "fixed" to another element, it can be directly fixed on the other element or intervening element may be present. When an element is considered to be "connected" to another element, it can be directly connected to the other element or intervening element may be present. The terms "vertical," "horizontal," "left," "right," and the like, as used herein, are for illustrative purposes only.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Unless otherwise defined, all terms (including technical and scientific terms) used herein have the same meaning as commonly understood by one of ordinary skill in the art to which this invention belongs. The terms used in the specification herein are only for the purpose of describing specific embodiments and are not intended to limit the present disclosure. The term "and/or" used herein includes any and all combinations of one or more of the associated listed items.

Cutting to form a special-shaped display screen which has an accommodating groove is a major process difficulty. Specifically, difficulty in cutting the display screen mainly lies in cutting precision and splitting difficulty. For a cutting device, the smaller the size of a chamfer, the more difficult the processing is. For the display screen that needs to perform a special-shaped cut to form the accommodating groove, chamfers at opposite ends of a bottom of the accommodating groove is a difficult process, and the processing precision is difficult to be ensured.

Figure 4:
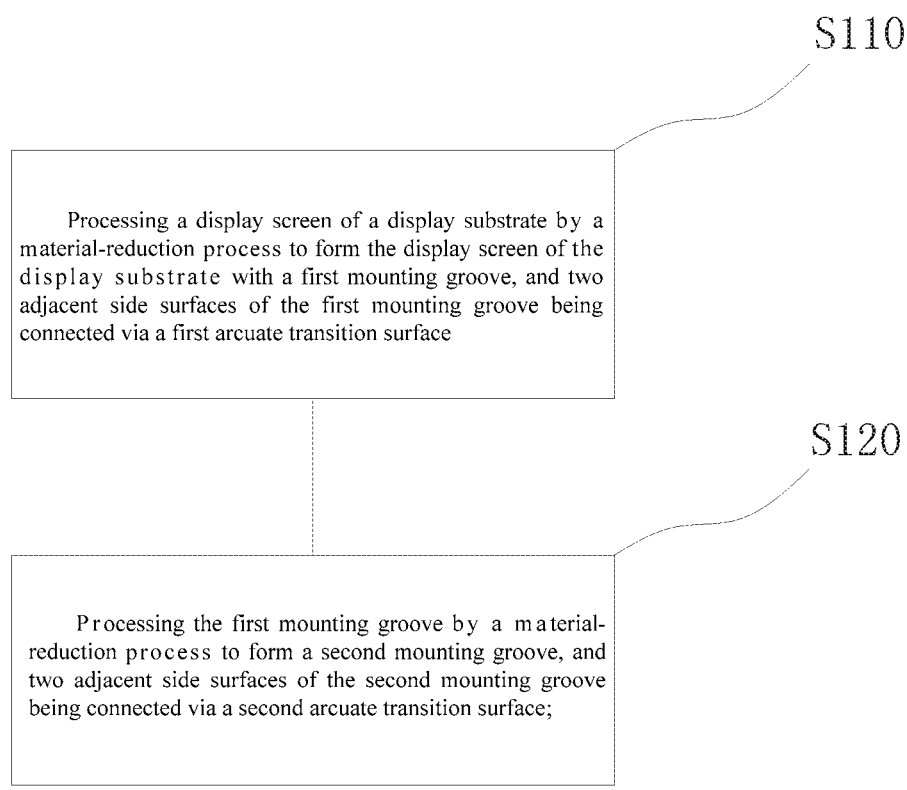
FIG. 4 is a flow chart of a grooving method of a display screen in accordance with an embodiment.
Figure 5:
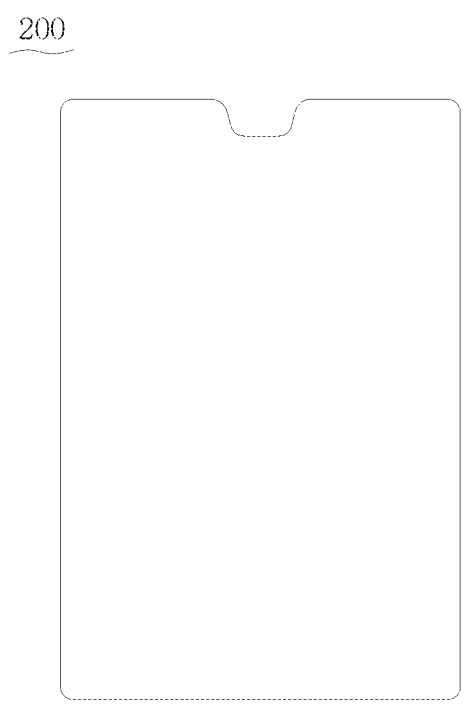
FIG. 5 is a schematic diagram of a display screen in accordance with an embodiment.

As shown in FIG. 1 and FIG. 4, a grooving method of a display screen is provided according to a preferred embodiment, which is, for example, used for processing a display screen 100 to form a special-shaped display screen 200 with a mounting groove (as shown in FIG. 5). The grooving method of the display screen includes the following steps.

In S110, the display screen 100 is processed by a material-reduction process to form the display screen 100 with a first mounting groove (e.g., also referred to as an initial groove), two adjacent side surfaces in the first mounting groove 120 are connected via a first arcuate transition surface 122.

Figure 2:
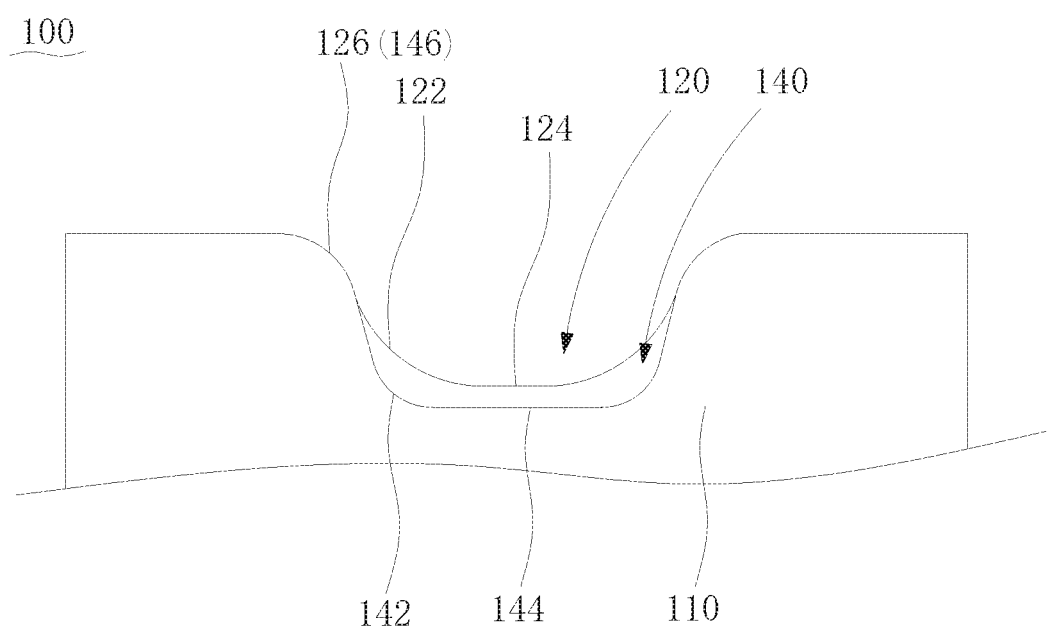
FIG. 2 illustrates a processing schematic diagram of a display screen in accordance with another embodiment.
Figure 3:
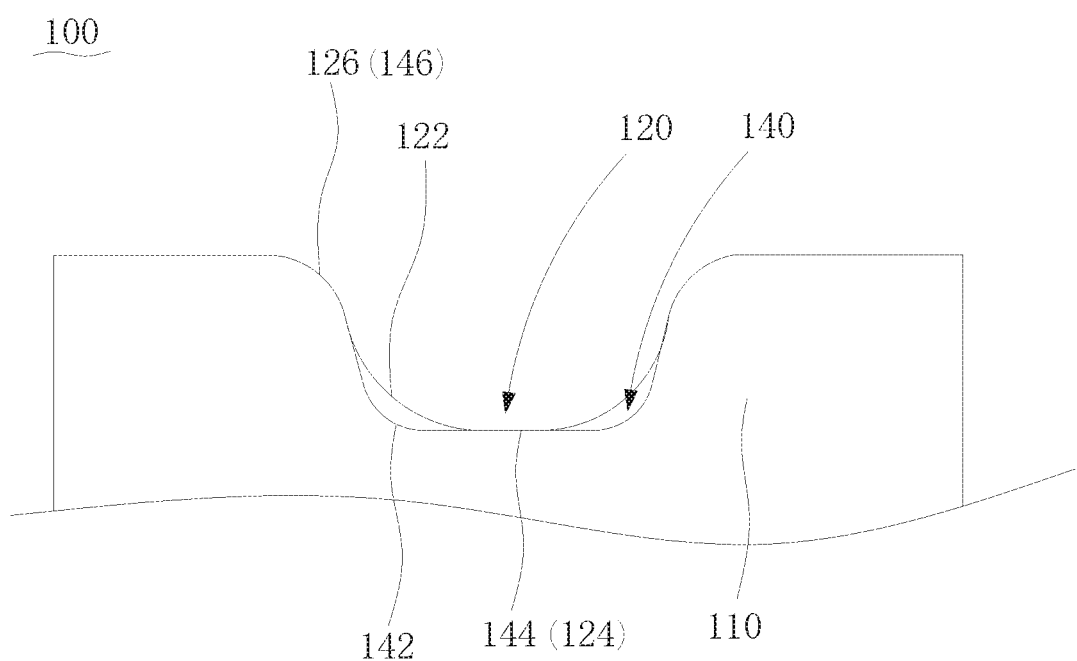
FIG. 3 illustrates a processing of a display screen in accordance with still another embodiment.

In S120, the first mounting groove 120 is processed by a material-reduction process to form a second mounting groove (e.g., also referred to as a finished groove) 140, and two adjacent side surfaces of the second mounting groove 140 are connected via a second arcuate transition surface 142. The display screen 100 includes an upper surface 110 and a lower surface (not shown) disposed opposite to each other. In the direction perpendicular to the paper surface as shown in FIG. 1 to FIG. 3, a front surface is the upper surface and a back surface is the lower surface. The first mounting groove 120 and the second mounting groove 140 extend through the upper surface 110 and/or the lower surface. Curvature of an orthographic projection of the first arcuate transition surface 122 on a plane in which the upper surface is located is smaller than curvature of an orthographic projection of the second arcuate transition surface 142 on the plane in which the upper surface 110 is located. In the present embodiment, the material-reduction processing refers to a processing manner during which materials of a processed product are constantly reduced. For example, the processing manner includes cutting (including blade cutting, laser cutting, stamping cutting, etc.), grinding, or other processing manners.

Further, the first mounting groove 120 and the second mounting groove 140 each include a plurality of side surfaces. The side surfaces and the first arcuate transition surface 122 cooperatively define the first mounting groove 120. The side surfaces and the second arcuate transition surface 142 cooperatively define the second mounting groove 140. At least two side surfaces of the first mounting groove 120 are connected via the first arcuate transition surface 122, and at least two side surfaces of the second mounting grooves 140 are also connected via the second arcuate transition surface 142.

When the display screen 100 is processed to form a mounting groove having a curved surface at a bottom of the display screen 100, the finished groove is generally formed at one time via splitting. Since the arcuate surface is located at an inner chamfer at a bottom of the mounting groove, it is easy to cause concentration of processing stress, which increases processing difficulty and reduces cutting precision and yield rate. In the aforementioned grooving method of the display screen 100, since the processing difficulty of the arcuate transition surface gradually increases as the curvature radius of the orthographic projection of the arcuate transition surface on the plane in which the upper surface 110 is located decreases, the first arcuate transition surface 122 with a larger curvature radius can be firstly formed via material-reduction processing, and the second arcuate transition surface 142 with a smaller curvature radius can then be formed via further material-reduction processing. This staged processing manner, in which the initial groove is formed via processing at first and then the initial groove is processed to form the finished groove, is different from a manner in which the arcuate transition surface with a smaller curvature radius is directly formed, thereby reducing processing equipment requirements and processing difficulty, and improving the cutting precision and yield rate of the display screen 100.

Specifically, in the present embodiment, the first arcuate transition surface 122 and the second arcuate transition surface 142 are both circular-arcuate transition surfaces (i.e., the orthographic projections of the first arcuate transition surface 122 and the second arcuate transition surface 142 on the plane in which the upper surface 110 is located are both circular-arcuate), thereby forming a special-shaped display screen 200 with a circular-arcuate inner chamfer. It can be understood that in other embodiments, at least one of the first arcuate transition surface 122 and the second arcuate transition surface 142 may also be an elliptical arcuate transition surface to form a special-shaped display screen 200 with a different shape.

Further, when the first arcuate transition surface 122 and the second arcuate transition surface 142 are both circular-arcuate transition surfaces, a ratio of a radius of the first arcuate transition surface 122 to a radius of the second arcuate transition surface 142 is greater than 1.1, thus avoiding excessive concentration of the processing stress, so that difficulty of directly processing to form the first arcuate transition surface 122 is much less than difficulty of directly processing to form the second curved transition surface 142, and difficulty of forming the second curved transition surface 142 from the first arcuate transition surface 122 is also much less than the difficulty of directly processing to form the second curved transition surface 142.

Preferably, the ratio of the radius of the orthographic projection of the first arcuate transition surface 122 on the plane in which the upper surface 110 is located to the radius of the orthographic projection of the second arcuate transition surface 142 on the plane in which the upper surface 110 is located is 1.2. For example, when the radius of the orthographic projection of the second arcuate transition surface 142 on the plane in which the upper surface 110 is located is 2 mm, the radius of the orthographic projection of the first arcuate transition surface 122 on the plane in which the upper surface 110 is located is 2.4 mm. Further, when the radius of the orthographic projection of the second arcuate transition surface 142 on the plane in which the upper surface 110 is located is 3 mm, the radius of orthographic projection of the first arcuate transition surface 122 on the plane in which the upper surface 110 is located is 3.6 mm. As such, the processing difficulty of directly forming the second arcuate transition surface 142 is alleviated by forming the first arcuate transition surface 122 at first and then forming the second arcuate transition surface 142, at the same time, excessive long processing time resulted by excessive process redundancy of forming the second arcuate transition surface 142 from the first arcuate transition surface 122, thereby ensuring a high processing efficiency and improving the yield rate. It can be understood that the ratio of the radius of the orthographic projection of the first arcuate transition surface 122 on the plane in which the upper surface 110 is located to the radius of the orthographic projection of the second arcuate transition surface 142 on the plane in which the upper surface 110 is located is not limited thereto, and the ratio may be set as 1.2, 1.3, 1.4, and so on according to different devices, different processing technology, and other factors.

Specifically, in the present embodiment, the first mounting groove 120 is formed by splitting the display screen 100, and the second mounting groove 140 is formed by grinding the first mounting groove 120.

Specifically, a cutting line is firstly drawn on the display screen 100, and a path of the cutting line is the same as an extending path of an edge of the first mounting groove 120. Then, the display screen 100 is placed on a workbench of the splitting machine, and the display screen 100 is split along the cutting line by pressing impact of a cutting structure such as a splitting pressing plate to form the first mounting groove 120, thereby ensuring a high processing efficiency and a high processing precision. Then, the display screen 100 having the first mounting groove 120 is placed on a fine grinder, and the first mounting groove 120 is ground by the fine grinder to form the second mounting groove 140, thereby achieving higher processing precision and yield rate. In this way, the grooving method of the display screen 100 combines two processing manners of splitting and grinding, and has a relatively high processing efficiency, a good yield rate and high processing precision. It can be understood that specific processing manners of the first mounting groove 120 and the second mounting groove 140 are not limited thereto, and different processing manners can be adopted according to different needs.

Further, the step S120 that the first mounting groove 120 is processed by a material-reduction process to form the second mounting groove 140, and two adjacent side surfaces of the second mounting groove 140 are connected via the second arcuate transition surface 142 includes the following step that:

the first arcuate transition surface 122 and side surfaces connected to the first arcuate transition surface 122 are processed by a material-reduction process.

Specifically, as shown in FIG. 1, in an embodiment, groove walls of the first mounting groove 120 includes two first arcuate transition surfaces 122, a first side surface 124 connecting the two first arcuate transition surfaces 122, and a second side surface 126 connecting ends of the two first arcuate transition surfaces 122 away from the first side surface 124. The two first arcuate side surfaces 122 and the first side surface 124 cooperatively form a curved surface. Groove walls of the second mounting groove 140 includes two second arcuate transition surfaces 142, a third side surface 144 connecting the two second arcuate transition surfaces 142, and a fourth side surface 146 connecting the ends of the two second arcuate transition surfaces 142 away from the third side surface 144. An orthographic projection of the first side surface 124 on the plane in which the upper surface 110 is located is a straight line, and the second side surface 126 and the fourth side surface 146 may at least partially coincide with each other. As such, the first arcuate transition surface 122 and the first side surface 124 may be ground to form the second arcuate transition surface 142 and the third side surface 144 at the same time. The first side surface 124 has a smaller process redundancy to save processing time.

As shown in FIG. 2, in another embodiment, the groove walls of the first mounting groove 120 includes two first arcuate transition surfaces 122, a first side surface 124 connecting the two first arcuate transition surfaces 122, and a second side surface 126 connecting ends of the two first arcuate transition surfaces 122 away from the first side surface 124. An orthographic projection of the first side surface 124 on the plane in which the upper surface 110 is located is a straight line. The groove walls of the second mounting groove 140 includes two second arcuate transition surfaces 142, a third side surface 144 connecting the two second arcuate transition surfaces 142, and a fourth side surface 146 connecting ends of the two second arcuate transition surfaces 142 away from the third side surface 144.

The second arcuate transition surfaces 142 and the fourth side surface 146 are connected via a straight transition groove wall section. An orthographic projection of the first side surface 124 on the plane in which the upper surface 110 is located is also a straight line. An orthographic projection of the transition groove wall section on the plane in which the upper surface 110 is located is also a straight line. The second side surface 126 and the fourth side surface 146 may at least partially coincide with each other. Thus, the first arcuate transition surface 122 and the first side surface 124 are ground to form the second arcuate transition surface 142, the transition groove wall section, and the third side surface 144 at the same time. Preferably, the first side surface 124 has a similar process redundancy as the first arcuate transition surface 122 to facilitate processing.

As shown in FIG. 3, in another embodiment, the groove walls of the first mounting groove 120 includes two first arcuate transition surfaces 122, a first side surface 124 connecting the two first arcuate transition surfaces 122, and a second side surface 126 connecting ends of the two first arcuate transition surfaces 122 away from the first side surface 124. The first arcuate transition surfaces 122 and the second side surface 126 are connected via a straight transition groove wall section. Orthographic projections of the first side surface 124 and the transition groove wall section of the first mounting groove 120 on the plane in which the upper surface 110 is located are straight lines. The groove walls of the second mounting groove 140 includes two second arcuate transition surfaces 142, a third side surface 144 connecting the two second arcuate transition surfaces 142, and a fourth side surface 146 connecting ends of the two second arcuate transition surfaces 142 away from the third side surface 144. The second arcuate transition surface 142 and the fourth side surface 146 are connected via a straight transition groove wall section. The second side surface 126 and the fourth side surface 146 at least partially coincide with each other. An orthographic projection of the third side surface 144 on the plane in which the upper surface 110 is located is a straight line, and the third side surface 144 and the first side surface 124 at least partially coincide with each other. An orthographic projection of the transition groove wall section of the second mounting groove 140 on the plane in which the upper surface 110 is located is a straight line. As such, the step S120 that the first mounting groove 120 is processed by a material-reduction process to form a second mounting groove 140, and two adjacent side surfaces of the second mounting groove 140 are connected via a second arcuate transition surface 142 includes the following step that the first arcuate transition surface 122 is processed by a material-reduction process. Thus, when the first arcuate transition surface 122 is processed by a material-reduction process to form the second arcuate transition surface 142, the first side surface 124 is not required to be processed, thereby further improving the processing efficiency.

Further, in the afore-described three embodiments, the two second arcuate transition surfaces 142 are symmetrically disposed on opposite ends of the third side surface 144, and a symmetric axis is a central symmetric axis of the second mounting groove 140. Radiuses of the two second arcuate transition surfaces 142 are the same. That is, the second mounting groove 140 has an axisymmetric shape.

Referring to FIG. 1 to FIG. 3 again, in the present embodiment, the first mounting groove 120 is formed at a middle portion of one end of the display screen 100. Specifically, the display screen 100 includes two symmetrically disposed short edges and two long edges symmetrically disposed to connect the two short edges respectively, and the first mounting groove 120 is formed on one of the short edges. Thus, the display screen 100 has a rectangular shape, and the short edge on one side of the display screen 100 is provided with the mounting groove to accommodate an electronic component such as a camera, which is different from that an electronic component such as a camera is placed on an edge of a rectangular display screen 100. It can be understood that, in other embodiments, the shapes and positions of the first mounting groove 120 and the second mounting groove 140 are not limited thereto, and the first mounting groove 120 and the second mounting groove 140 may also be a closed shape with a curved chamfer.

In the afore-mentioned grooving method of the display screen 100, the display screen 100 is firstly processed by a material-reduction process to form the first mounting groove 120 by splitting or the like, and then the first mounting groove 120 with the first arcuate transition surface 122 is further processed by a material-reduction process to form the second mounting groove 140 with the second arcuate transition surface 142 by grinding or the like. Since the second arcuate transition surface 142 has a large curvature radius and has high processing difficulty, the first arcuate transition surface 122 having a small curvature is firstly formed by processing, and then the second arcuate transition surface 142 is formed by processing on the basis of the first arcuate transition surface 122, thereby reducing the processing difficulty and the requirements on the equipment, and improving the cutting effect and the yield rate.

Preferably, a grooving method of a display screen provided in the present disclosure may also be as follow.

In step (A), a first material-reduction processing operation is performed within a predetermined grooving area of the display screen 100 to form an initial groove 120 in the predetermined grooving area which extends through the upper surface 110 and the lower surface. Preferably, the initial groove 120 in this embodiment is an opened groove. For example, as shown in FIG. 1, groove walls of the initial groove 120 can be continuous arcuate section, which includes a second side surface 126, a first arcuate transition surface 122, and a first side surface 124 which are arranged symmetrically with respect to a center line of the initial groove 120. Alternatively, as shown in FIGS. 2 and 3, the groove walls of the initial groove 120 may include at least one first straight groove wall section (e.g. the first side surface 124 in FIGS. 2 and 3), and a first arcuate groove wall section smooth-transitionally connected to the first straight groove wall section (the first arcuate transition surface 122 in FIGS. 2 and 3). In the case that the initial groove 120 is an opened groove, the groove walls of the initial groove 120 may further include a third arcuate groove wall section disposed at the opening (the second side surface 126 in FIG. 1 to FIG. 3), and the third arcuate groove wall section located at the opening and groove wall sections adjacent to the third arcuate groove wall section are smooth-transitionally connected. In FIGS. 1 and 2, the third arcuate groove wall section and the first arcuate transition surface 122 adjacent to the third arcuate groove wall section are smooth-transitionally connected. In FIG. 3, the second side surface 126 and the first arcuate transition surface 122 are connected with each other via a straight transition groove wall section (not numbered in FIG. 3), and the transition groove wall section of the initial grooves 120 are smooth-transitionally connected to the second side surface 126 and the first arcuate transition surface 122 respectively.

In step (B), a second material-reduction processing operation is performed on the initial groove 120 to form a finished groove 140. In this embodiment, the initial groove 120 is an opened groove, and the finished groove 140 is also correspondingly an opened groove. For example, referring to FIGS. 1 to 3, groove walls of the finished groove 140 includes at least two second straight groove wall sections (including, for example, the third side surface 144 of FIGS. 1 to 3, and two unnumbered straight groove wall sections between the second arcuate transition surface 142 and the fourth side surface 146), and a second arcuate groove wall section (the second arcuate transition surface 142 in FIGS. 1 to 3) connected between each two adjacent second straight groove wall sections. In the case that the finished groove 140 is an opened groove, the groove walls of the finished groove 140 can further include a fourth arcuate groove wall section (the fourth side surface 146 in FIGS. 1 to 3) disposed at the opening, and the fourth arcuate groove wall section and groove wall sections adjacent to the fourth arcuate groove wall section are smooth-transitionally connected. In FIGS. 1 to 3, the second arcuate transition surface 142 and the fourth side surface 146 are connected with each other via a straight transition groove wall section (not numbered), the fourth side surface 146 and the transition groove wall sections of the finished groove 140 are smooth-transitionally connected, and the transition groove wall sections of the finished groove 140 and the second arcuate transition surface 142 are smooth-transitionally connected.

In the present disclosure, the initial groove 120 is pre-processed within the predetermined grooving area of the display screen 100, the finished groove 140 is formed by further processing on the basis of the initial groove 120, which may avoid the problem that when the finished groove is formed on the display screen 100 via one-time processing, the inner chamfer of the finished groove is small, which may result in that the screen is easily broken due to stress concentration during processing.

Preferably, an area of the initial groove 120 is greater than 50 percent of an area of the finished groove 140. Preferably, the area of the initial groove 120 is less than 90 percent of the area of the finished groove 140. In addition, the first arcuate groove wall section (the first arcuate transition surface 122) and the second arcuate groove wall section (the second arcuate transition surface 142) are disposed opposite to each other, and may both have a circular arcuate shape. A curvature radius of the first arcuate groove wall section is larger than a curvature radius of the second arcuate groove wall section. In this way, when processing grooves in the display screen 100, staged processing manner is employed in the present disclosure. That is, the initial groove 120 is firstly formed via material-reduction processing. The initial groove 120 has the first arcuate groove wall section with a relatively large curvature radius (the first arcuate transition surface 122). Then the initial groove 120 is further processed by a material-reduction process to form the finished groove 140. The finished groove 140 has the second arcuate groove wall section with a relatively small curvature radius (the second arcuate transition surface 142). Different from a method in which the arcuate transition surface with a relatively small curvature radius is directly formed via one-time processing, this processing method can not only reduce the processing difficulty and the requirements on the processing equipment, but also greatly improve the cutting accuracy and yield rate of the display screen 100.

Preferably, a portion of the groove wall of the initial groove 120 coincides with a portion of the groove wall of the finished groove 140. As shown in FIGS. 1 and 2, the second side surface 126 and the fourth side surface 146 have a coincident portion. In FIG. 3, not only the second side surface 126 and the fourth side surface 146 have a coincident portion, the first side surface 124 and the third side surface 144 also have a coincident portion.

Preferably, in the present embodiment, the initial groove 120 and the finished groove 140 are opened grooves, and the finished groove 140 is substantially trapezoidal. It should be understood that in other embodiments, the finished groove 140 may be substantially, for example, rectangular. Preferably, the initial groove 120 may be substantially trapezoidal or rectangular, or the initial groove 120 may also be elliptical or circular-arcuate, etc. In addition, in other embodiments, the initial groove 120 and the finished groove 140 may also be closed grooves. When the finished groove 140 is a closed groove, the finished groove 140 may be any designed shape such as circular-arcuate, rectangular, rounded, elliptical, trapezoidal, etc.

Preferably, a material-reduction processing manner of the first material-reduction processing operation is different from a material-reduction processing manner of the second material-reduction processing operation. Due to that the initial groove 120 has a larger curvature radius at a curved position, the material-reduction processing manner of the first material-reduction processing operation may employ cutting processing manner (such as laser cutting, blade cutting, stamping cutting, etc.) to form the initial groove 120. Preferably, the initial groove 120 is formed via splitting processing. Since the finished groove 140 has a small curvature radius at a curved position (at a corner), the material-reduction processing manner of the second material-reduction processing operation may employ a grinding processing manner to form the finished groove 140 with a high processing accuracy. Alternatively, the material-reduction processing manner of the second material-reduction processing operation may employ a combination of the cutting processing manner and the grinding processing manner to form the finished groove 140. For example, the initial groove 120 is firstly roughly cut, and then finely ground to form the finished groove 140. It can be understood that in other embodiments, both the first material-reduction processing operation and the second material-reduction processing operation may employ cutting processing manners. It can be understood that the specific processing manner of the material-reduction processing operation is not limited to the afore-described enumeration, and different processing manners may be adopted according to different needs.

As shown in FIG. 5, a special-shaped display screen 200 is further provided in the present disclosure. The special-shaped display screen 200 is provided with a groove formed by the above-mentioned grooving method of the display screen.

In this way, the special-shaped display screen 200 has a mounting groove (a finished groove). The mounting groove may provide an accommodating space for an electronic component such as a camera, so that it is not required to preset a space around the edge to dispose the electronic component, thereby improving screen ratio of a smart device provided with the special-shaped display screen 200. Moreover, since the yield rate of the special-shaped display screen 200 is high, manufacturing cost of the smart device provided with the special-shaped display screen 200 is reduced.

The technical features of the above-described embodiments can be combined arbitrarily. For the sake of brevity of description, all possible combinations of the technical features in the above embodiments are not described. However, as long as there is no contradiction between the combinations of these technical features, all the combinations should be considered as the scope of this disclosure.

The above-mentioned embodiments are merely illustrative of several embodiments of the present disclosure, and the description thereof is more specific and detailed, but is not intended to limit the scope of the present disclosure. It should be noted that a number of variations and modifications can be made by those skilled in the art without departing from the spirit and scope of the present disclosure. Therefore, the scope of the present disclosure should be determined by the appended claims.

The invention claimed is:

1. A method of manufacturing a display screen, comprising:
   processing the display screen by a material-reduction process to form a first mounting groove on the display screen, two adjacent side surfaces of the first mounting groove being connected via a first arcuate transition surface, the first mounting groove further comprising a third arcuate groove wall section configured at an opening of the first mounting groove, the third arcuate groove wall section being smooth-transitionally connected to the first arcuate transition surface; and
   processing the first mounting groove by a material-reduction process to form a second mounting groove, two adjacent side surfaces of the second mounting groove being connected via a second arcuate transition surface, the second mounting groove further comprising a fourth arcuate groove wall section configured at an opening of the second mounting groove, the fourth arcuate groove wall section being smooth-transitionally connected to the second arcuate transition surface;
   wherein:
   the display screen comprises an upper surface and a lower surface opposite disposed;
   the first mounting groove and the second mounting groove extend through the upper surface and the lower surface; and
   a curvature radius of an orthographic projection of the second arcuate transition surface on a plane in which the upper surface is located is smaller than a curvature radius of an orthographic projection of the first arcuate transition surface on the plane in which the upper surface is located.

2. The method of manufacturing the display screen according to claim 1, wherein the first arcuate transition surface and the second arcuate transition surface are both circular-arcuate transition surfaces.

3. The method of manufacturing the display screen according to claim 2, wherein a ratio of the curvature radius of the orthographic projection of the first arcuate transition surface on the plane in which the upper surface is located to the curvature radius of the orthographic projection of the second arcuate transition surface on the plane in which the upper surface is located is greater than 1.1.

4. The method of manufacturing the display screen according to claim 1, wherein the processing the first mounting groove by a material-reduction process to form a second mounting groove, two adjacent side surfaces of the second mounting groove being connected via a second arcuate transition surface comprises:
   processing the first arcuate transition surface and the side surfaces connected to the first arcuate transition surface by a material-reduction process.

5. The method of manufacturing the display screen according to claim 1, wherein the processing the first mounting groove by a material-reduction process to form a second mounting groove, two adjacent side surfaces of the second mounting groove being connected via a second arcuate transition surface comprises:
   processing the first arcuate transition surface by a material-reduction process.

6. The method of manufacturing the display screen according to claim 1, wherein the first mounting groove is formed by splitting the display screen.

7. The method of manufacturing the display screen according to claim 1, wherein the second mounting groove is formed by grinding the first mounting groove.

8. The method of manufacturing the display screen according to claim 6, wherein the second mounting groove has an axisymmetric shape.

9. The method of manufacturing the display screen according to claim 1, wherein the first mounting groove is formed in a middle portion of an end of the display screen.

10. A display screen, provided with a groove formed via the grooving method of the display screen according to claim 1.

11. A method of manufacturing a display screen, the display screen comprising opposite disposed upper surface and lower surface, the grooving method comprising:
    performing a first material-reduction processing operation within a predetermined grooving area of the display screen to form an initial groove within the predetermined grooving area extending through the upper surface and the lower surface; groove walls of the initial groove having a continuous arcuate section; or the groove walls of the initial groove comprising at least one first straight groove wall section and a first arcuate groove section smooth-transitionally connected to the first straight groove wall section; and
    performing a second material-reduction processing operation on the initial groove to form a finished groove; groove walls of the finished groove comprising at least two second straight groove wall sections and a second arcuate groove wall section connected between two adjacent second straight groove wall sections;
    wherein the groove walls of the initial groove further comprises a third arcuate groove wall section disposed at an opening of the initial groove, the third arcuate groove wall section and groove walls adjacent the third arcuate groove wall section are smooth-transitionally connected;
    wherein the groove walls of the finished groove further comprises a fourth arcuate groove wall section disposed at an opening of the finished groove, and the fourth arcuate groove wall section and groove walls adjacent to the fourth arcuate groove wall section are smooth-transitionally connected.

12. The method of manufacturing the display screen according to claim 11, wherein an area of the initial groove is greater than 50 percent of an area of the finished groove.

13. The method of manufacturing the display screen according to claim 11, wherein the first arcuate groove wall section and the second arcuate groove wall section are disposed opposite to each other and are both circular-arcuate, and a curvature radius of the first arcuate groove wall section is no less than a curvature radius of the second arcuate groove wall section.

14. The method of manufacturing the display screen according to claim 11, wherein a portion of the groove walls of the initial portion coincides with a portion of the groove walls of the finished groove.

15. The method of manufacturing the display screen according to claim 11, wherein the initial groove and the finished groove are both opened grooves.

16. The method of manufacturing the display screen according to claim 15, wherein the finished groove is substantially rectangular or trapezoidal.

17. The method of manufacturing the display screen according to claim 11, wherein the initial groove and the finished groove are both closed grooves.

18. The method of manufacturing the display screen according to claim 11, wherein the first material-reduction processing operation employs a cutting process to form the initial groove; and the cutting process is a splitting processing manner.

19. The method of manufacturing the display screen according to claim 18, wherein the second material-reduction processing operation employs a grinding processing manner to form the finished groove; or the second material-reduction processing operation employs a combination of a cutting processing manner and a grinding processing manner to form the finished groove.

\* \* \* \* \*